United States Patent
Ding et al.

(10) Patent No.: US 9,215,078 B2
(45) Date of Patent: Dec. 15, 2015

(54) MULTICAST METHOD AND MULTICAST DEVICE

(71) Applicant: Huawei Technologies Co., Ltd., Shenzhen, Guangdong (CN)

(72) Inventors: Hancheng Ding, Nanjing (CN); Wentao Li, Suzhou (CN); Junjun Song, Nanjing (CN); Yu Qin, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 189 days.

(21) Appl. No.: 14/025,491

(22) Filed: Sep. 12, 2013

(65) Prior Publication Data

US 2014/0016639 A1    Jan. 16, 2014

Related U.S. Application Data

(63) Continuation of application No. PCT/CN2011/082999, filed on Nov. 26, 2011.

(30) Foreign Application Priority Data

Mar. 25, 2011    (CN) .......................... 2011 1 0074098

(51) Int. Cl.
*H04L 12/18*    (2006.01)
*H04L 12/46*    (2006.01)

(52) U.S. Cl.
CPC ............ *H04L 12/18* (2013.01); *H04L 12/1886* (2013.01); *H04L 12/4641* (2013.01)

(58) Field of Classification Search
None
See application file for complete search history.

(56) References Cited

U.S. PATENT DOCUMENTS

| 2003/0123453 | A1* | 7/2003 | Ooghe | H04L 12/1886 370/395.53 |
| 2004/0179470 | A1* | 9/2004 | Nguyen | G06F 1/206 370/216 |
| 2006/0088031 | A1* | 4/2006 | Nalawade | H04L 12/185 370/390 |

(Continued)

FOREIGN PATENT DOCUMENTS

| CN | 1424833 A | 6/2003 |
| CN | 200962602 Y | 10/2007 |

(Continued)

OTHER PUBLICATIONS

Deering, S., "Host Extensions for IP Multicasting," Aug. 1989, Network Working Group, IETF, Fremont, California.

(Continued)

*Primary Examiner* — Hassan Phillips
*Assistant Examiner* — Ayanah George
(74) *Attorney, Agent, or Firm* — Leydig, Voit & Mayer, Ltd.

(57) ABSTRACT

The present invention provides a multicast method and a multicast device. The method includes: receiving a multicast request from a user, where the multicast request includes multicast channel information and a user VLAN tag; selecting a first target multicast VLAN from pre-configured multiple multicast VLANs; after replacing the user VLAN tag in the multicast request with the first target multicast VLAN tag, forwarding the multicast request to a multicast router; receiving multicast traffic sent by the multicast router through the first target multicast VLAN, and forwarding the multicast traffic to the user. In the present invention, a target multicast VLAN is selected according to multicast channel information, so that multicast requests for the same multicast channel can be added to the same multicast VLAN. In this way, only one copy of multicast traffic of the same channel exists on a local area network, thereby saving network bandwidth resources.

12 Claims, 6 Drawing Sheets

(56) References Cited

U.S. PATENT DOCUMENTS

2007/0116014 A1* 5/2007 Shuen ................ H04L 12/2856
370/395.53
2007/0127459 A1* 6/2007 Lo ....................... H04L 12/4666
370/389

FOREIGN PATENT DOCUMENTS

| CN | 201004649 Y | 1/2008 |
|---|---|---|
| CN | 101170464 A | 4/2008 |
| CN | 101184023 A | 5/2008 |
| CN | 101626301 A | 1/2010 |

OTHER PUBLICATIONS

Fenner, W., "Internet Group Management Protocol, Version 2," Nov. 1997, Network Working Group, IETF, Fremont, California.
Cain et al., "Internet Group Management Protocol, Version 3," Oct. 2002, Network Working Group, IETF, Fremont, California.
Christensen, M., "Considerations for Internet Group Management Protocol (IGMP) and Multicast Listener Discovery (MLD) Snooping Switches," May 2006, Network Working Group, IETF, Fremont, California.
International Search Report in corresponding PCT Patent Application No. PCT/CN2011/082999 (Mar. 8, 2012).

* cited by examiner

MULTICAST METHOD AND MULTICAST DEVICE

CROSS-REFERENCE TO RELATED APPLICATIONS

This application is a continuation of International Patent Application No. PCT/CN2011/082999, filed on Nov. 26, 2011, which claims priority to Chinese Patent Application No. 201110074098.1, filed on Mar. 25, 2011, both of which are hereby incorporated by reference in their entireties.

TECHNICAL FIELD

The present disclosure relate to network communication technologies, and in particular, to a multicast method and a multicast device.

BACKGROUND

The Internet Group Management Protocol (Internet Group Management Protocol, abbreviated as IGMP) is a host-to-router signaling mechanism used by Internet Protocol (Internet Protocol, abbreviated as IP) multicast in a user network segment, and implements the function of managing group members by interacting IGMP messages between the host and the router. A multicast service is generally implemented based on the IGMP protocol. Specifically, multicast traffic from a multicast source is firstly forwarded between routers; the last-hop router copies the multicast traffic to each access virtual local area network (Virtual Local Area Network, abbreviated as VLAN); and then a switch distributes the multicast traffic on the local area network until the multicast traffic is distributed to a receiving host.

When users access a multicast network by using different VLANs as their identifiers but request a same channel, the last-hop router copies multicast traffic of the same channel to each VLAN, thereby ensuring that each VLAN user can receive the multicast traffic successfully. Using a scenario illustrated in FIG. 1 as an example, multicast requests of users access the multicast network by using VLAN 100 to VLAN 300; when all the users request a same channel, a router R copies the multicast traffic of the channel to VLAN 100 to VLAN 300 respectively to ensure that each user can receive the multicast traffic successfully.

During the implementation of the present invention, the inventors find that the prior art has at least following problems: When users request the same channel, 201 copies of traffic of the same channel with different VLAN tags exist in a link router R→switch SA→switch SB, that is, multiple copies of traffic with different VLAN tags are forwarded on the local area network, which occupies a large amount of bandwidth and causes a huge waste of network bandwidth.

SUMMARY

Embodiments of the present invention provide a multicast method and a multicast device to save network bandwidth resources.

An embodiment of the present invention provides a multicast method, including:

receiving a multicast request from a user, where the multicast request includes multicast channel information and a user virtual local area network VLAN tag;

selecting, according to the multicast channel information, a first target multicast VLAN from pre-configured multiple multicast VLANs;

forwarding the multicast request to a multicast router after replacing the user VLAN tag in the multicast request with the first target multicast VLAN tag; and receiving multicast traffic sent by the multicast router through the first target multicast VLAN, and forwarding the multicast traffic to the user.

An embodiment of the present invention provides a multicast device, including:

a first receiving module, configured to receive a multicast request from a user, where the multicast request includes multicast channel information and a user virtual local area network VLAN tag;

a selecting module, configured to select, according to the multicast channel information, a first target multicast VLAN from pre-configured multiple multicast VLANs;

a first forwarding module, configured to forward the multicast request to a multicast router after replacing the user VLAN tag in the multicast request with the first target multicast VLAN tag; and a second receiving module, configured to receive multicast traffic sent by the multicast router through the first target multicast VLAN, and forward the multicast traffic to the user.

By using the multicast method and multicast device provided in the embodiments of the present invention, after a multicast request is received from a user, a multicast VLAN is selected from multiple multicast VLANs according to multicast channel information in the multicast request, and a multicast service is implemented according to the selected multicast VLAN. In the embodiments of the present invention, a target multicast VLAN is selected from pre-configured multiple multicast VLANs according to multicast channel information, so that multiple multicast requests for the same multicast channel can be added to a multicast VLAN; the multicast VLAN sends a multicast request to a multicast router, so that multicast traffic of the same multicast channel is sent through the multicast VLAN and only one copy of multicast traffic exists on the local area network. This solves the problem in the prior art that multiple copies of multicast traffic of the same channel exists on the local area network, and reduces occupancy of network bandwidth, thereby saving network bandwidth resources.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
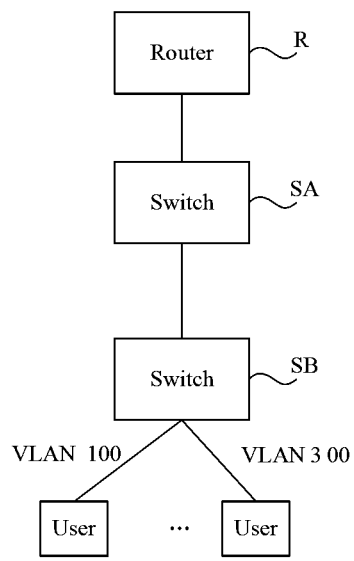
FIG. 1 is a schematic structural diagram of a multicast network in the prior art.
Figure 2:
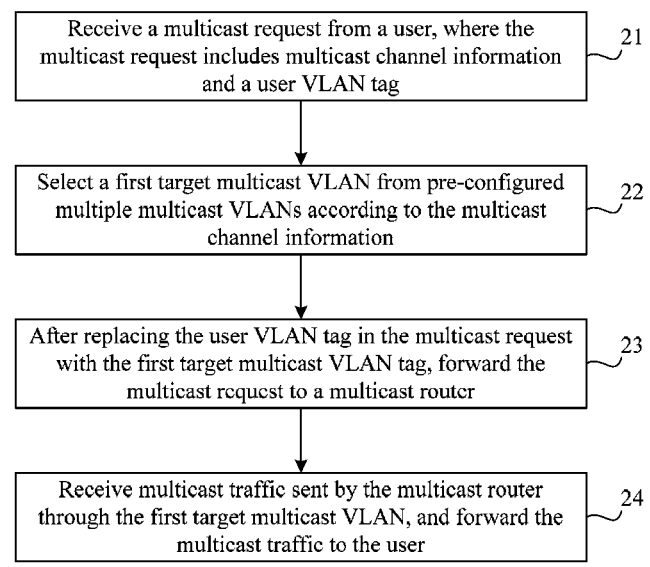
FIG. 2 is flowchart of a multicast method according to a first embodiment of the present invention.

FIG. 2 is flowchart of a multicast method according to a first embodiment of the present invention. As shown in FIG. 2, the multicast method provided in this embodiment includes the following steps:

Step 21: Receive a multicast request from a user, where the multicast request includes multicast channel information and a user VLAN tag.

Specifically, when a user requests a channel, the user sends a multicast request to a switch (hereinafter referred to as an access switch) directly connected to the user, that is, the user sends an IGMP Report message to the access switch. The IGMP Report message carries information such as an address of a multicast channel requested by the user and a tag of the VLAN where the user is located, that is, a user VLAN ID. The access switch receives the multicast request from the user, and parses the multicast request to obtain the multicast channel information and the user VLAN ID in the multicast request.

Step 22: Select a first target multicast VLAN from pre-configured multiple multicast VLANs according to the multicast channel information.

Multiple multicast VLANs are pre-configured on the access switch, and a physical multicast path is configured for each multicast VLAN, that is, a ring network instance is configured for each multicast VLAN. In a scenario in which multiple multicast routers exist, multiple multicast routers are configured with ring network instances of different multicast VLANs, respectively. In this way, the access switch selects one multicast VLAN, that is, a first target multicast VLAN, from the pre-configured multiple multicast VLANs, to implement multicast through a physical multicast path where the first target multicast VLAN is located.

Step 23: Forward the multicast request to a multicast router after the user VLAN tag in the multicast request is replaced with the first target multicast VLAN tag.

The multicast router is located in a ring network instance where the first target multicast VLAN is located, and the multicast router is responsible for processing the multicast request sent through the first target multicast VLAN.

Specifically, the access switch replaces the user VLAN tag in the multicast request with the first target multicast VLAN tag, and then sends the multicast request to the multicast router. In this way, the access switch sends the multicast request to the multicast router through the first target multicast VLAN. When multiple users concurrently request the same channel, all user VLAN tags in the multicast requests of the multiple users can be replaced with the first target multicast VLAN tag, and the multicast requests are forwarded to the multicast router. In this way, the multicast router can process the multicast requests of the multiple users for the same multicast channel through one multicast VLAN, and sends only one copy of multicast traffic to the access switch. Forwarding a multicast request to the multicast router by the access switch specifically means that the multicast request is forwarded to upper layers on a layer-to-layer basis along the physical multicast path where the first target multicast VLAN is located until the multicast request reaches the multicast router.

Step 24: Receive multicast traffic sent by the multicast router through the first target multicast VLAN, and forward the multicast traffic to the user.

When a multicast service on the network is normal, the multicast router copies multicast traffic corresponding to the multicast channel to the first target multicast VLAN after receiving the multicast request, that is, the multicast router sends the multicast traffic from a port bound to the first target multicast VLAN, and forwards the multicast traffic to the access switch along the physical multicast path where the first target multicast VLAN is located; the access switch receives the multicast traffic from the multicast router, and then replaces the first target multicast VLAN tag carried in the multicast traffic with the user VLAN tag to forward the multicast traffic to the user. When there are multiple users, the access switch forwards the multicast traffic to multiple users each.

In this embodiment, by using a multicast VLAN, the copy point of multicast is shifted from a multicast router down to an access switch; the multicast router needs only to copy multicast traffic to a first target multicast VLAN and forward the multicast traffic to a local area network. In this way, only one copy of multicast traffic exists in a backbone link of the local area network, thereby greatly reducing consumption of bandwidth resources.

According to the multicast method provided in this embodiment, when a multicast request is received from a user, a multicast VLAN is selected according to a multicast channel requested by the user, and multicast requests for the same multicast channel can be added to the same multicast VLAN, and a multicast request is initiated through the selected multicast VLAN, so that the multicast router needs only to copy multicast traffic to the multicast VLAN and forward the multicast traffic to an access switch. In this way, only one copy of multicast traffic exists in a path from the multicast router to the access switch, which solves the problem in the prior art that multiple copies of multicast traffic of the same channel exist on the local area network, thereby reducing occupancy of network bandwidth resources, and saving network bandwidth resources.

Further, for pre-configured multiple multicast VLANs, a different physical multicast path may be configured for each multicast VLAN. In this way, the access switch can select different multicast VLANs for multicast channels according to different multicast channels, and disperse multicast requests of users and corresponding multicast traffic into different physical multicast paths, thereby implementing load sharing of a multicast service and utilizing network bandwidth resources more effectively.

Because this embodiment is implemented based on configured multiple multicast VLANs, the following describes the processes of managing and using the multiple multicast VLANs in detail.

Specifically, in this embodiment, when multiple multicast VLANs are configured, a multicast VLAN group is created, and the multiple multicast VLANs are bound to the multicast VLAN group, that is, the multiple multicast VLANs are managed by using the multicast VLAN group. In addition, a mapping relationship between a user VLAN and the multicast VLAN group is established. When a user sends a multicast request to the access switch through a user VLAN, the access switch performs a HASH operation according to the user VLAN and the multicast channel requested, selects a target multicast VLAN dynamically, and converge all user VLANs under the same channel into the selected target multicast VLAN; the selected target multicast VLAN initiates a multicast request to implement a multicast service.

Based on the foregoing description, this embodiment provides an implementation mode for the access switch to select a first target multicast VLAN from the multiple multicast VLANs. Details are described as follows: When the access switch receives a multicast request from a user VLAN, the access switch obtains multicast channel information in the multicast request; based on the multicast channel information, the access switch establishes a current multicast set, an invalid service multicast set, and a candidate multicast set for the multicast channel information, and initializes the current multicast set and the invalid service multicast set to be null and initializes the candidate multicast set to include multiple multicast VLANs. The current multicast set is used to store a currently used multicast VLAN, that is, the target multicast VLAN. The invalid service multicast set is used to store an invalid multicast VLAN. That is, after the access switch selects the target multicast VLAN according to the multicast channel information, if a multicast service on the target multicast VLAN is abnormal, the target multicast VLAN is regarded as an invalid multicast VLAN and is stored in the invalid service multicast set. The candidate multicast set is used to store a multicast VLAN that is not yet used by the multicast channel Specifically, when a service fault occurs on the currently used multicast VLAN, the access switch re-selects, from the candidate multicast set, a target multicast VLAN for the multicast channel.

Then, the access switch performs a HASH operation, by using the multicast channel information and the candidate multicast set as inputs, to obtain a first target multicast VLAN. Specifically, the access switches performs a HASH operation by using the multicast channel information and the multicast VLAN in the candidate multicast set as inputs to obtain the first target multicast VLAN. Under initialization conditions, the access switch performs a HASH operation by using the multicast channel information and all multicast VLANs as inputs to obtain a first target multicast VLAN.

After selecting the first target multicast VLAN, the access switch removes the first target multicast VLAN from the candidate multicast set, and adds the first target multicast VLAN to the current multicast set to implement using and managing multicast VLANs.

Further, after replacing the user VLAN tag in the multicast request with the first target multicast VLAN tag, the access switch forwards the multicast request to a multicast router along a physical multicast path where the first target multicast VLAN is located. In addition, the access switch monitors multicast traffic corresponding to the multicast channel information to monitor whether a multicast service on the first target multicast VLAN is faulty. Specifically, when forwarding the multicast request to the multicast router, the access switch starts a traffic monitoring timer, and pre-sets a timing period of the timer to periodically monitor multicast traffic corresponding to the multicast channel information. For example, when monitoring behavior such as there being no traffic suddenly, the access switch considers that the multicast traffic is abnormal. When the access switch finds that the multicast traffic is abnormal, a service fault occurs on the first target multicast VLAN, and the access switch re-performs a HASH operation by using the multicast channel information and the multicast VLAN in the current candidate multicast set as inputs to obtain a second target multicast VLAN. The current candidate multicast set does not include the first target multicast VLAN. That is, the access switch re-selects a target multicast VLAN from multicast VLANs except for the first multicast VLAN.

After selecting a second target multicast VLAN, the access switch replaces the user VLAN tag in the multicast request with the second target multicast VLAN tag, and re-forwards the multicast request to the multicast router, so as to send the multicast request through the new target multicast VLAN and implement a multicast service. In addition, the access switch removes the first target multicast VLAN from the current multicast set, and adds the first target multicast VLAN to the invalid service multicast set, and removes the second target multicast VLAN from the candidate multicast set, and adds the second target multicast VLAN to the current multicast set.

When a multicast service on the second target multicast VLAN is normal, the multicast router copies multicast traffic corresponding to the multicast channel information to the second target multicast VLAN after receiving a multicast request, and forwards the multicast traffic to the access switch by using a physical multicast path where the second target multicast VLAN is located; and the access switch forwards the multicast traffic to the user.

It should be noted that the physical multicast path where the first target multicast VLAN is located is different from the multicast path where the second target multicast VLAN is located, but the multicast router corresponding to the first target multicast VLAN may be the same as the multicast router corresponding to the second target multicast VLAN, which specifically depends on the configurations of the multicast VLANs. When different multicast routers are configured for different multicast paths, the multicast traffic can be allocated to different multicast paths, and load sharing between the multicast routers can be implemented, so that processing resources of the multicast routers are utilized more reasonably.

Further, when the re-selection of a target multicast VLAN is performed for multiple times, there may be no available multicast VLAN in the candidate multicast set. To ensure that a target multicast VLAN can also be obtained to implement a multicast service, this embodiment provides an implementation mode of obtaining a second target multicast VLAN, specifically including: determining, by the access switch, whether the candidate multicast set is null; when the determination result is that the candidate multicast set is not null, there is still an available multicast VLAN on the current candidate multicast VLAN, performing, by the access switch, a HASH operation directly by using the multicast channel information and the multicast VLAN in the candidate multicast set as inputs to obtain a second target multicast VLAN; if the determination result is that the candidate multicast set is null, which indicates that all multicast VLANs are faulty, re-initializing, by the access switch, the current multicast set and the invalid service multicast set to be null, initializing the candidate multicast set to include pre-configured multiple multicast VLANs, and starting a delay timer, where the delay timer is preset with a timing time; after the delay timer expires, performing a HASH operation by using the multicast channel information and multiple multicast VLANs in the candidate multicast set as inputs to obtain a second target multicast VLAN.

By using the foregoing implementation mode, in one aspect, it can be ensured that when no multicast VLAN is available in the candidate multicast set, a target multicast VLAN can still be selected to implement a multicast service;

in another aspect, by using the delay timer, performance of the switch may not be reduced due to such operations as frequent monitoring and frequent initialization.

Based on the foregoing technical solution, because each access switch on a network selects a target multicast VLAN independently, the convergence of multicast VLANs needs to be ensured, that is, ensuring that the same multicast channel has the same target multicast VLAN, so as to avoid a case where different access switches select different multicast VLANs as the target multicast VLAN for the same multicast channel due to asynchronization of the timer and avoid occurring that multiple copies of multicast traffic of the same multicast channel exist on the network due to dispersing of on-demand requests for the same multicast channel into different multicast VLANs. Therefore, this embodiment provides a method for converging multicast VLANs.

Specifically, when the first target multicast VLAN is faulty, the access switch replaces the user VLAN tag in the multicast request with the second target multicast VLAN tag, and forwards the multicast request to the multicast route, and meanwhile forwards the multicast request in which the user VLAN tag is replaced with the second target multicast VLAN tag to the multicast router.

If the first target multicast VLAN recovers from the fault, the multicast router receives a multicast request sent by the first target multicast VLAN and by the second target multicast VLAN each, and copies multicast traffic to each of the first target multicast VLAN and the second target multicast VLAN to forward the multicast traffic to the access switch. In this case, the access switch receives two copies of multicast traffic. To avoid that the two copies of multicast traffic are forwarded to the user, when the access switch receives multicast traffic sent by the multicast router through the first target multicast VLAN, the access switch replaces the first target multicast VLAN tag in the multicast traffic with the user VLAN tag, and then forwards the multicast traffic to the user. Meanwhile, the access switch removes the first target multicast VLAN from the invalid service multicast set, and adds the first target multicast VLAN to the current multicast set, and removes the second target multicast VLAN from the current multicast set, and adds the second target multicast VLAN to the candidate multicast set, so as to receive multicast traffic according to the first target multicast VLAN. The access switch may discard the received multicast traffic sent by the multicast router through the second target multicast VLAN, and does not forward the multicast traffic. This ensures that the user receives only one copy of the multicast traffic, thereby saving network bandwidth.

If the fault of the first target multicast VLAN is not recovered, the multicast router does not receive the multicast request sent from the first target multicast VLAN, and therefore does not copy the multicast traffic to the first target multicast VLAN to forward the multicast traffic to the access switch. In such case, the access switch does not receive the multicast traffic sent by the multicast router through the first target multicast VLAN. Then, the access switch replaces the second target multicast VLAN tag in the received multicast traffic with the user VLAN tag, and then forwards the multicast traffic to the user, so as to continue to receive multicast traffic through the second target multicast VLAN.

According to the foregoing embodiment, different access switches can select the same target multicast VLAN for the same multicast channel, to implement convergence of target multicast VLANs, which avoids the occurrence of multiple copies of multicast traffic of the same multicast channel on a network, thereby saving bandwidth resources.

The foregoing embodiment describes working principles about how to implement a multicast service by setting multiple multicast VLANs and selecting a target multicast VLAN according to the multicast request of the user. The following embodiments describe in detail, with reference to actual network conditions, the process of configuring multiple multicast VLANs to implement a multicast service.

Figure 3A:
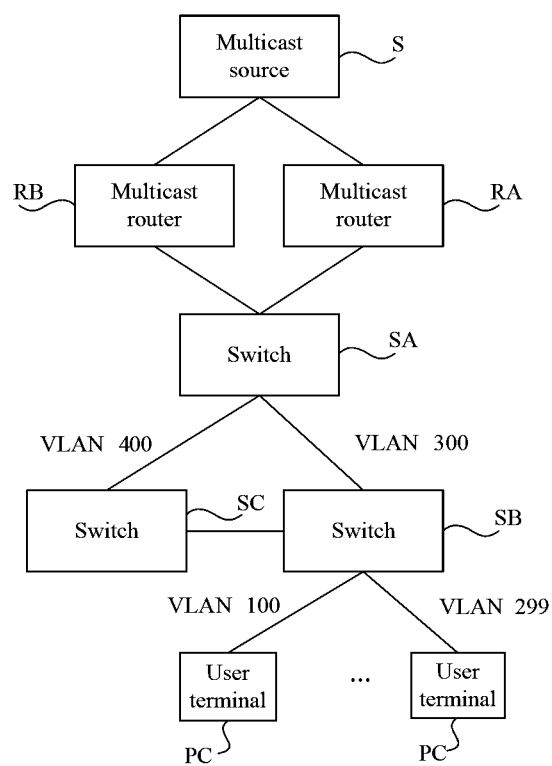
FIG. 3A is a schematic diagram of a network topology of multiple multicast VLANs according to a second embodiment of the present invention.
Figure 3B:
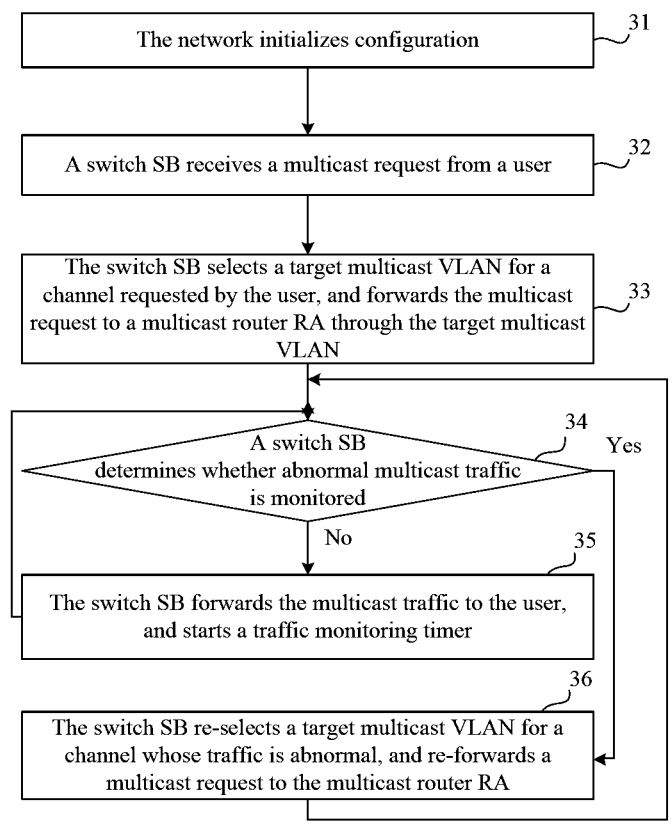
FIG. 3B is flowchart of a multicast method according to a second embodiment of the present invention.

FIG. 3A is a schematic diagram illustrating a network topology of multiple multicast VLANs according to a second embodiment of the present invention. FIG. 3B is flowchart of a multicast method according to the second embodiment of the present invention. A network shown in FIG. 3A includes a multicast source S, a multicast router RA, a multicast router RB, a switch SA, a switch SB, a switch SC, and user terminal PCs. The switch SB is an access switch, and the user terminal PCs access the switch SB through user VLAN 100 to user VLAN 299; the switch SB is connected to the switch SC, the switch SB and the switch SC each are connected to the switch SA; the switch SA is connected to the multicast router RA and the multicast router RB; and the multicast router RA and the multicast router RB are connected to the multicast source S through the network. Based on the foregoing network structure, a multicast method provided in this embodiment includes the following steps:

Step 31: The network initializes configuration.

Specifically, a multicast VLAN 300 and a multicast VLAN 400 are pre-configured on the switch SA to the switch SC respectively, and are marked as an MVLAN 300 and an MVLAN 400 respectively, and a multicast VLAN group is established to manage the MVLAN 300 and the MVLAN 400. Then, the user VLAN 100 to the user VLAN 299 are configured on the switch SA to the switch SC, respectively, as users of the multicast VLAN group.

Then, different physical multicast paths are configured for the MVLAN 300 and the MVLAN 400, that is, multiple ring network instances are configured. In this embodiment, the MVLAN 300 and the MVLAN 400 are mapped to two instances respectively, that is, the MVLAN 400 is configured as the first instance, and the physical multicast path corresponding to the MVLAN 400 is switch SB→switch SC→switch SA→multicast router RA; the MVLAN 300 is configured as the second instance, and the physical multicast path corresponding to the MVLAN 300 is switch SB→switch SA→multicast router RA. To avoid the occurrence of a loop, it is assumed that a chokepoint of the first instance is located on a port where the switch SB is connected to the switch SA and that a chokepoint of the second instance is located on a port where the switch SB is connected to the switch SC. After the configuration is completed, spanning trees corresponding to the two instances are calculated according to the network topology. In this embodiment, to facilitate subsequent descriptions, the two instances are configured on the multicast router RA, which is not limited herein. For example, to implement load sharing between the multicast router RA and the multicast router RB, two instances can also be configured on the multicast router RA and the multicast router RB, respectively.

Step 32: The switch SB receives a multicast request of a user.

In this embodiment, it is assumed that users on the user VLAN 100 and user VLAN 200 that are connected to the switch SB request a first channel and a second channel, respectively. The user terminals PCs send multicast requests to the switch SB, that is, they send IGMP Report messages to the switch SB. The IGMP Report message carries a channel address and a user VLAN ID. After receiving the IGMP Report messages, the switch SB obtains the channel addresses from the IGMP Report messages, establishes a current multicast set MVLAN_CURRENT, an invalid service multicast set MVLAN_SET_INVALID, and a candidate multicast set MVLAN_SET_CANDIDATE for each of the first channel and the second channel, and initializes the foregoing three sets each. The initialization states corresponding to the first channel and the second channel are illustrated in Table 1 below.

TABLE 1

| Name of set | Value |
| --- | --- |
| MVLAN_SET_CANDIDATE | (MVLAN 300, MVLAN 400) |
| MVLAN_SET_INVALID | (NULL) |
| MVLAN_CURRENT | (NULL) |

Step 33: The switch SB selects a target multicast VLAN for a channel requested by the user, and forwards the multicast request to the multicast router RA through the target multicast VLAN.

The switch SB performs a HASH operation by using the channels and the MVLAN_SET_CANDIDATE as input parameters to select a target multicast VLAN for the first channel and the second channel, respectively. In this embodiment, it is assumed that HASH (G1, MVLAN_SET_CANDIDATE$_{G1}$)=MVLAN 300 and HASH (G2, MVLAN_SET_CANDIDATE$_{G2}$)=MVLAN400. After selecting the corresponding target multicast VLAN, the switch SB updates the sets and timers corresponding to the first channel and the second channel according to the selection result, respectively. In this case, the states of the sets and timers corresponding to the first channel and the second channel are illustrated in Table 2 and Table 3 below, respectively.

TABLE 2

| Name of set | Value |
| --- | --- |
| MVLAN_SET_CANDIDATE | (MVLAN 400) |
| MVLAN_SET_INVALID | (NULL) |
| MVLAN_CURRENT | (MVLAN 300) |
| TIMER_PROBE | Created |

TABLE 3

| Name of Set | Value |
| --- | --- |
| MVLAN_SET_CANDIDATE | (MVLAN 300) |
| MVLAN_SET_INVALID | (NULL) |
| MVLAN_CURRENT | (MVLAN 400) |
| TIMER_PROBE | Created |

Then, after replacing the user VLAN 100 and the user VLAN 200 in the IGMP Report messages with the MVLAN 300 and the MVLAN 400, respectively, that is, after converting the IGMP Report messages into multicast requests on the multicast VLAN, the switch SB forwards the multicast requests to upper layers, that is, forwards the multicast request for the first channel to the multicast router RA along the multicast path switch SB→switch SA corresponding to the second instance, and forwards the multicast request for the second channel to the multicast router RA along the multicast path switch SB→switch SC→switch SA corresponding to the first instance. Parallel to send multicast requests, the switch SB establishes and starts a traffic monitoring timer TIMER_PROBE (as shown in Table 2 and Table 3) respectively for the first channel and the second channel to periodically monitor whether traffics of the first channel and the second channel are abnormal.

Step 34: The switch SB receives multicast traffic, and determines whether abnormal multicast traffic is monitored; if the determination result is negative, step 35 is performed; otherwise, step 36 is performed.

When a multicast service is normal on the network, the multicast router RA, after receiving the multicast requests from the first channel and the second channel, copies the multicast traffic of the first channel to the MVLAN 300 and copies the multicast traffic of the second channel to the MVLAN 400 to forward the multicast traffic to the switch SA; and the switch SA forwards the multicast traffic to the switch SB along different multicast paths corresponding to the second instance and the first instance respectively. In this embodiment, when forwarding the multicast requests, the switch SB starts the TIMER_PROBE to monitor whether multicast traffic exists in the MVLAN 300 and the MVLAN 400 on a timed basis; if the switch SB does not receive multicast traffic when the TIMER_PROBE expires, the traffic is abnormal, and step 36 is performed; otherwise, the traffic is normal, and step 35 is performed. When the TIMER_PROBE corresponding to the first channel and the second channel expires, the switch SB starts a new round of timing directly to continue to monitor whether the multicast traffic is abnormal.

Step 35: The switch SB forwards the multicast traffic to the user, and re-starts the traffic monitoring timer. Then, step 34 is performed.

The switch SB specifically replaces the MVLAN 300 in the multicast traffic of the first channel with the user VLAN 100, and replaces the MVLAN 400 in the multicast traffic of the second channel with the user VLAN 200, so as to copy the multicast traffic to end users respectively.

In this embodiment, multiple multicast VLANs are configured, and different ring network instances are configured for the multicast VLANs, so that multicast traffic of different channels can be shared in different physical links, thereby effectively utilizing network bandwidth resources.

Step 36: The switch SB re-selects a target multicast VLAN for a channel whose traffic is abnormal, and re-forwards a multicast request to the multicast router RA. Then, step 34 is performed.

In this embodiment, it is assumed that the multicast traffic on the MVLAN 400 is abnormal, that is, the user cannot obtain the multicast traffic corresponding to the second channel, the switch SB re-performs a HASH operation by using the second channel and the current MVLAN_SET_CANDIDATE (as shown in Table 3) as input parameters to re-obtain a target multicast VLAN. In this way, the switch B obtains the MVALN 300. After re-selecting the MVLAN 300, the switch SB updates the sets corresponding to the second channel, that is, it moves the MVLAN 300 from the MVLAN_SET_CANDIDATE to the MVLAN_CURRENT, and moves the MVLAN 400 from the MVLAN_CURRENT to the MVLAN_SET_INVALID, as shown in Table 4 below.

TABLE 4

| Name of Set | Value |
| --- | --- |
| MVLAN_SET_CANDIDATE | (NULL) |
| MVLAN_SET_INVALID | (MVLAN 400) |
| MVLAN_CURRENT | (MVLAN 300) |
| TIMER_PROBE | Created |

Then, after replacing the user VLAN 200 in the IGMP Report message with the MVLAN 300, that is, after converting the IGMP Report message into a multicast request on the multicast VLAN, the switch SB forwards the multicast request to upper layers, that is, forwards the multicast request for the second channel to the multicast router RA along the multicast path switch SB→switch SA corresponding to the second instance. Parallel to send the multicast request, the switch SB re-starts the traffic monitoring timer TIMER_PROBE corresponding to the second channel to periodically monitor whether the traffic of the second channel is abnormal.

In this step, if the MVLAN_SET_CANDIDATE corresponding to the second channel is null, that is, if no multicast VLAN is available, the switch SB re-initializes the sets corresponding to the second channel, as shown in Table 1, and simultaneously creates a delay timer TIMER_DELAY for the second channel; after the TIMER_DELAY expires, the switch SB re-performs a HASH operation by using the second channel and the MVLAN_SET_CANDIDATE as input parameters to obtain a new target multicast VLAN. In this embodiment, with respect to the same channel, when the MVLAN_SET_CANDIDATE is the same, the selected target multicast VLANs are same, so as to implement convergence of the target multicast VLANs. In this case, the target multicast VLAN of the second channel re-selected by the switch SB is the MVLAN 400.

Further, it is assumed that a user under the switch SC begins to request the second channel, the switch SC selects the MVLAN 300 as the target multicast VLAN of the second channel when the MVLAN 400 is still faulty. However, if the MVLAN 400 is recovered, the switch SC selects the MVLAN 400 for the second channel because each switch selects a target multicast VLAN independently. In this way, two copies of multicast traffic of the second channel exist on the network at the same time, thereby causing a waste of bandwidth resources. Therefore, in this embodiment, while access switches (that is, the switch SB and the switch SC) create forwarding entries for the multicast VLANs in the MVLAN_CURRENT, the access switches also create forwarding entries for each multicast VLAN in the MVLAN_SET_INVALID. In addition, the following rule is set: when the access switches create the forwarding entries for each multicast VLAN in the MVLAN_SET_INVALID to forward data, multicast traffic is not forwarded to a port of user VLAN but needs to be forwarded selectively by the access switch according to the actual situation, so as to prevent users from receiving multiple copies of multicast traffic.

Based on the foregoing description, when the switch SB and the switch SC provided in this embodiment receive an IGMP Report message, they not only forward the IGMP Report message to the multicast router RA after replacing the user VLAN ID in the IGMP Report message with the MVLAN 300, but also forward the IGMP Report message to the multicast router RA after replacing the user VLAN ID in the IGMP Report message with the MVLAN 400, and then monitor multicast traffic on the MVALN 300 and the MVLAN 400. When the MVLAN 400 recovers, the switch SB and the switch SC will monitor the multicast traffic of the second channel on the MVLAN 400. For the second channel, the MVLAN 400 enjoys a higher priority. Therefore, the switch SB and the switch SC provided in this embodiment switch a multicast service to the MVALN 400 to receive multicast traffic through the MVLAN 400.

Using the switch SB as an example, the process of switching a multicast service to the MVLAN 400 by the switch SB is specifically as follows: When monitoring the multicast traffic on the MVLAN 400, the switch SB firstly sends an IGMP Leave (Leave) message to the upstream switch SA to remove the second channel from the MVLAN 300, and clear forwarding entry corresponding to the second channel; then, the switch SB deletes the MVLAN 300 from the MVLAN_CURRENT to release the MVLAN 300 in the MVLAN_SET_CANDIDATE, and moves the MVLAN 400 from the MVLAN_SET_INVALID to the MVLAN_CURRENT. Then, the forwarding entry corresponding to the second channel on the MVLAN 400 becomes valid, and the switch SB forwards the multicast traffic to the user by using the forwarding entry. States of all sets corresponding to the switch SB upon the completion of switching are illustrated in Table 3.

According to the multicast method provided in this embodiment, multiple multicast VLANs are configured, and different multicast VLANs are configured on different ring network instances; then, according to multicast requests of users, the same multicast channel is allocated to the same multicast VLAN, and different multicast channels are allocated to different multicast VLANs. In this way, in the process of implementing a multicast service, only one copy of multicast traffic of the same multicast channel exists in a path from the multicast router to the access switch, thereby saving network bandwidth resources. Meanwhile, multicast traffic of different channels is allocated to different multicast paths, thereby improving usage rate of network bandwidth resources. In addition, when different ring network instances can correspond to different multicast routers, load sharing between multicast routers is implemented, so that processing resources of the multicast routers are used more fully. Furthermore, when a multicast service on a target multicast VLAN is faulty, re-selection of a target multicast VLAN is initiated actively, thereby increasing robustness of a multicast service. Further, compared with the prior art, in this embodiment, different channels are allocated to different ring network instances to correspond to different multicast routers. When one multicast router is faulty, a multicast service on other multicast routers is not affected, thereby increasing reliability of a multicast service. Finally, by performing convergence processing on the target multicast VLANs, it can be guaranteed that a target multicast VLAN selected by a specific channel on the entire network is the same one, so that only one copy of multicast traffic of the same channel exists on the network, thereby further saving network bandwidth resources.

Figure 4:
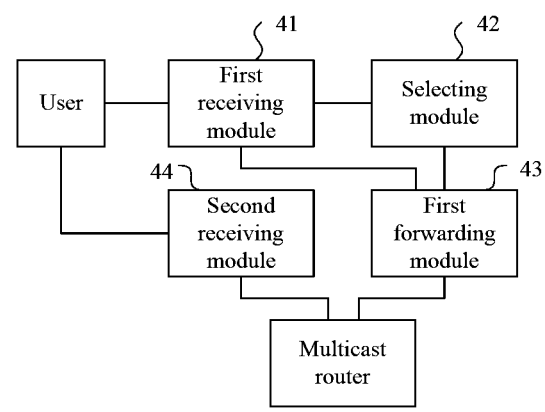
FIG. 4 is a schematic structural diagram of a multicast device according to a third embodiment of the present invention.

FIG. 4 is a schematic structural diagram of a multicast device according to a third embodiment of the present invention. As shown in FIG. 4, the multicast device provided in this embodiment includes a first receiving module 41, a selecting module 42, a first forwarding module 43, and a second receiving module 44.

The first receiving module 41 is connected to a user and is configured to receive a multicast request from the user, where the multicast request includes multicast channel information and a user VLAN tag; the selecting module 42 is connected to the first receiving module 41 and is configured to select a first target multicast VLAN from pre-configured multiple multicast VLANs according to the multicast channel information; the first forwarding module 43 is connected to the first receiving module 41, the selecting module 42, and a multicast router and is configured to forward the multicast request to the multicast router after replacing the user VLAN tag in the multicast request with the first target VLAN; the second receiving module 44 is connected to the multicast router and the user and is configured to receive multicast traffic sent by the multicast router through the first target multicast VLAN, and forward the multicast traffic to the user.

In this embodiment, each functional module in the multicast device can be configured to perform processes of the foregoing method embodiments; working principles of the functional modules are not further described herein, and for details, reference may be made to the description of the foregoing method embodiments.

According to the multicast device provided in this embodiment, when a multicast request is received from a user, a multicast VLAN is selected according to a multicast channel requested by the user, so that multicast requests for the same multicast channel may be added to the same multicast VLAN; and a multicast request is initiated through the selected multicast VLAN, so that the multicast router needs only to copy multicast traffic to the multicast VLAN to forward the multicast traffic to an access switch. In this way, only one copy of multicast traffic exists in a path from the multicast router to the access switch, which solves the problem in the prior art that multiple copies of multicast traffic of the same channel exist on the local area network, and reduces occupancy of network bandwidth resources, thereby saving network bandwidth resources.

Further, for pre-configured multiple multicast VLANs, a different physical multicast path may be configured for each multicast VLAN. In this way, the access switch can select different multicast VLANs for different multicast channels according to different multicast channels, and further disperse multicast requests of users and corresponding multicast traffic into different physical multicast paths, thereby implementing load sharing of a multicast service and increasing utilization of network bandwidth resources.

Figure 5:
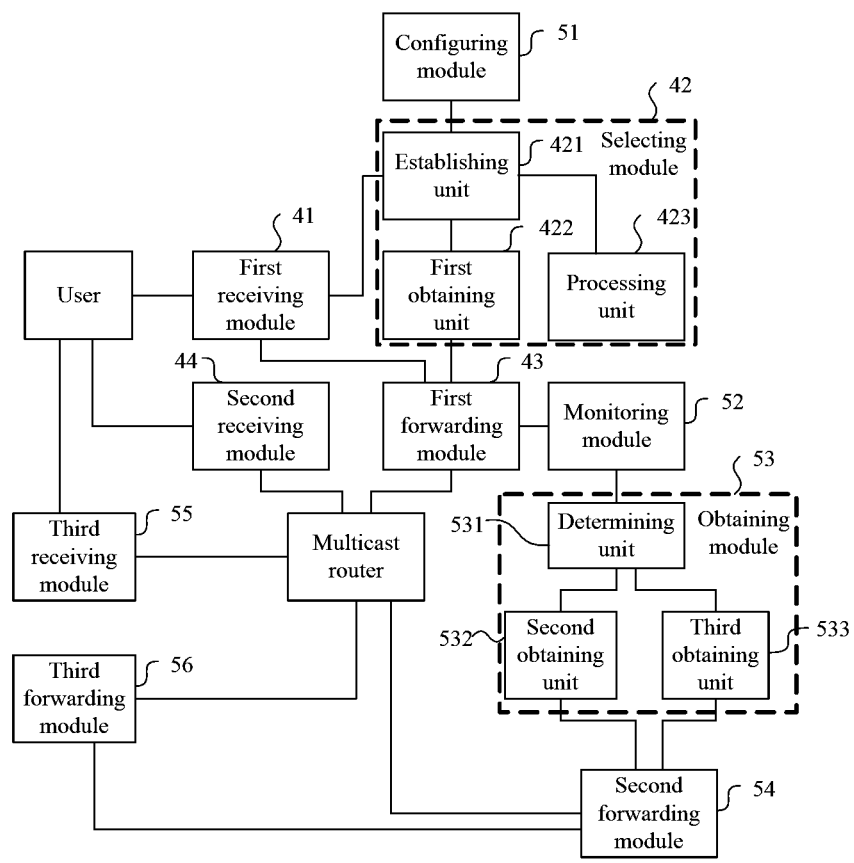
FIG. 5 is a schematic structural diagram of a multicast device according to a fourth embodiment of the present invention.

FIG. 5 is a schematic structural diagram of a multicast device according to a fourth embodiment of the present invention. This embodiment is based on the fourth embodiment. As shown in FIG. 5, the multicast device provided in this embodiment further includes a configuring module 51.

The configuring module is configured to: before the first receiving module 41 receives a multicast request from a user, pre-configure multiple multicast VLANs, and configure a different physical multicast path for each multicast VLAN. For specific working principles of the configuring module 51, reference may be made to corresponding description of the foregoing method embodiment, which is not further described herein.

According to the multicast device provided in this embodiment, a configuring module configures multiple multicast VLANs and configures a different physical multicast path for each multicast VLAN. In this way, the multicast device provided in this embodiment can select different multicast VLANs as target multicast VLANs of multicast channels, and disperse multicast requests of users and multicast traffics into different physical multicast paths, thereby increasing utilization of network bandwidth resources. In addition, when multiple multicast paths configured for multiple multicast VLANs correspond to different multicast routers respectively, different multicast channels are dispersed into different multicast VLANs to implement load sharing between the multicast routers. In this way, processing resources of the multicast routers may be utilized more adequately, thereby increasing utilization of network resources.

Further, in this embodiment, the selecting module 42 includes an establishing unit 421, a first obtaining unit 422, and a processing unit 423. The establishing unit 421 is connected to the first receiving module 41 and is configured to establish a current multicast set, an invalid service multicast set, and a candidate multicast set for multicast channel information, initialize the current multicast set and the invalid service multicast set to be null, and initialize the candidate multicast set to include multiple multicast VLANs; the first obtaining unit 422 is connected to the establishing unit 421 and is configured to perform a HASH operation by using the multicast channel information and the candidate multicast set as inputs to obtain a first target multicast VLAN; and the processing unit 423 is connected to the establishing unit 421 and is configured to remove the first target multicast VLAN from the candidate multicast set and add the first target multicast VLAN to the current multicast set.

In this embodiment, each functional unit of the selecting module can be configured to perform the corresponding process of selecting a first target multicast VLAN under initial conditions provided in the foregoing method embodiment; working principles of the functional units are not further described, and for details, reference may be made to corresponding description of the method embodiment.

According to the multicast device provided in this embodiment, the foregoing functional units mange and use multiple multicast VLANs, so that a target multicast VLAN is selected from the multiple multicast VLANs, which lays a foundation for implementing a multicast service based on the target multicast VLAN.

Based on the foregoing embodiment, the multicast device provided in this embodiment further includes a monitoring module 52, an obtaining module 53, a second forwarding module 54, and a third receiving module 55.

The monitoring module 52 is connected to the first forwarding module 43 and is configured to monitor multicast traffic corresponding to the multicast channel information after the first forwarding module 43 replaces the user VLAN tag in the multicast request with the first target multicast VLAN tag and forwards the multicast request to the multicast router. Specifically, when the first forwarding module 43 forwards the multicast request to the multicast router, the monitoring module 52 can start a traffic monitoring timer to periodically monitor the multicast traffic corresponding to the multicast channel information. The obtaining module 53 is connected to the monitoring module 52 and is configured to: when the monitoring module 52 finds that multicast traffic is abnormal, perform a HASH operation by using the multicast channel information and the current candidate multicast set as inputs to obtain a second target multicast VLAN. The second forwarding module 54 is connected to the obtaining module 53 and the multicast router, and is configured to: after replacing the user VLAN tag in the multicast request with the second target multicast VLAN tag, re-forward the multicast request to the multicast router, remove the first target multicast VLAN from the current multicast set, and add the first target multicast VLAN to the invalid service multicast set, and remove the second target multicast VLAN from the candidate multicast set, and add the second target multicast VLAN to the current multicast set. The third receiving module 55 is connected to the multicast router and the user and is configured to receive multicast traffic sent by the multicast router through the second target multicast VLAN, and forward the multicast traffic to the user.

The foregoing functional modules of the multicast device provided in this embodiment may be configured to perform corresponding processes of re-selecting a target multicast VLAN when the target multicast VLAN is faulty and implementing a multicast service in the foregoing method embodiment; their working principles are not further described, and for details, reference may be made to the description of the method embodiment.

It should be noted that in this embodiment, functions of the obtaining module 53, the second forwarding module 54, and the third receiving module 55 are similar to functions of the selecting module 42, the first forwarding module 43, and the second receiving module 44. Therefore, each of the corresponding functional modules may be actually implemented by the same module.

According to the multicast device provided in this embodiment, each of the foregoing functional modules can automatically initiate an operation of re-selecting a target multicast VLAN when a current target multicast VLAN is faulty, thereby increasing robustness of a multicast service on the network.

Further, the obtaining module 53 provided in this embodiment includes a determining unit 531, a second obtaining unit 532, and a third obtaining unit 533. The determining unit 531 is configured to determine whether the candidate multicast set is null; the second obtaining unit 532 is connected to the determining unit 531 and is configured to: when the candidate multicast set is not null, perform a HASH operation by using the multicast channel information and the current candidate multicast set as inputs to obtain a second target multicast VLAN; the third obtaining unit 533 is connected to the determining unit 531 and is configured to: when the candidate multicast set is null, re-initialize the current multicast set and the invalid service multicast set to be null and initialize the candidate multicast set to include multiple multicast VLANs, and then start a delay timer; when the delay timer expires, perform a HASH operation by using the multicast channel information and the candidate multicast set as inputs to obtain a second target multicast VLAN.

The foregoing functional units can be configured to perform the corresponding process of obtaining a second target multicast VLAN provided in the foregoing method embodiment. Working principles of the foregoing functional units are not further described, and for details, reference may be made to the description of the method embodiment.

According to the multicast device provided in this embodiment, when a candidate multicast set is null, the foregoing functional units can obtain a target multicast VLAN for multicast channel information to implement a multicast service, thereby increasing robustness of a multicast service.

Further, the multicast device provided in this embodiment further includes: a third forwarding module 56, connected to the multicast router and the second forwarding module 54 and configured to forward the multicast request in which the user VLAN tag is replaced with the first target multicast VLAN tag to the multicast router, when the second forwarding module 54 re-forwards the multicast request to the multicast router after replacing the user VLAN tag in the multicast request with the second target multicast VLAN tag.

Based on the foregoing descriptions, after the fault of the first target multicast VLAN is recovered, the second receiving module 44 and the third receiving module 55 each receive multicast traffic corresponding to the multicast channel information. In this case, the second receiving module 44 is specifically configured to: receive multicast traffic sent by the multicast router through the first target multicast VLAN and forward the multicast traffic to the user after replacing the first target multicast VLAN in the multicast traffic with the user VLAN; and meanwhile remove the first target multicast VLAN from the invalid service multicast set, and add the first target multicast VLAN to the current multicast set, and remove the second target multicast VLAN from the current multicast set, and add the second target multicast VLAN to the candidate multicast set to receive multicast traffic according to the first target multicast VLAN. In this case, the third receiving module 55 receives multicast traffic sent by the multicast router through the second target multicast VLAN, discards the multicast traffic, and does not forward the multicast traffic to the user. In addition, the second receiving module 44 continues to receive multicast traffic subsequently, while the third receiving module 55 no longer receives multicast traffic.

The foregoing functional units can be configured to perform the corresponding process of converging target multicast VLANs provided in the foregoing method embodiment. Working principles of the foregoing functional modules are not further described, and for details, reference may be made to the description of the method embodiment.

According to the multicast device provided in this embodiment, the foregoing functional modules can select the same multicast VLAN for the same multicast channel, and implement the convergence of target multicast VLANs. In this way, only one copy of multicast traffic of the same multicast channel exists on a network, thereby saving network bandwidth resources.

A person of ordinary skill in the art may understand that all or part of the steps of the foregoing method embodiments may be implemented by a program instructing relevant hardware. The foregoing program may be stored in a computer readable storage medium. When the program runs, the foregoing steps comprised in the method embodiments are performed. The foregoing storage medium may be any medium capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that they may still make modifications to the technical solutions described in the foregoing embodiments, or make equivalent replacements to some technical features thereof without departing from the spirit and scope of the technical solutions of the embodiments of the present invention.

What is claimed is:

1. A multicast method performed by a switch directly connected to a first user and a second user, the method comprising:

receiving a first multicast request from the first user, wherein the first multicast request comprises a first multicast channel address and a first user virtual local area network (VLAN) tag;

selecting, in response to receiving the first multicast request from the first user, a first target multicast VLAN from pre-configured multiple multicast VLANs, the selecting including:

establishing: a current multicast set, an invalid service multicast set, and a candidate multicast set for the first multicast channel;

initializing: the current multicast set to be null, the invalid service multicast set to be null, and the candidate multicast set to comprise multiple multicast VLANs;

performing a HASH operation, using the first multicast channel address and the candidate multicast set as inputs, to obtain the first target multicast VLAN from the candidate multicast set; and removing the first target multicast VLAN from the candidate multicast set, and adding the first target multicast VLAN to the current multicast set;

forwarding, after the selecting, the first multicast request to a multicast router through the first target multicast VLAN after replacing the first user VLAN tag, in the first multicast request, with a first target multicast VLAN tag;

receiving, after the selecting, a second multicast request from the second user, wherein the second multicast request comprises the first multicast channel address and a second user VLAN tag;

receiving multicast traffic sent by the multicast router through the first target multicast VLAN, and forwarding, in response to receiving multicast traffic, the multicast traffic to:

the first user by replacing the first target multicast VLAN tag in the multicast traffic with the first user VLAN tag, and the second user by replacing the first target multicast VLAN tag in the multicast traffic with the second user VLAN tag, thereby ensuring only one copy of the multicast traffic, forwarded by the switch to the directly connected first user and second user, is transmitted in a path from the multicast router to the switch.

2. The multicast method according to claim 1, wherein before the receiving the first multicast request from the first user, the method further comprises:

pre-configuring the multiple multicast VLANs, and configuring a different physical multicast path for each of the multicast VLANs.

3. The multicast method according to claim 1, wherein after the forwarding the first multicast request to the multicast router, the method further comprises:

monitoring multicast traffic corresponding to the first multicast channel address;

when the multicast traffic is abnormal, performing the HASH operation by using the first multicast channel address and the candidate multicast set as inputs to obtain a second target multicast VLAN;

replacing the first user VLAN tag in the first multicast request with the second target multicast VLAN tag, and thereafter performing the further steps of:

re-forwarding the first multicast request to the multicast router;

removing the first target multicast VLAN from the current multicast set, adding the first target multicast VLAN to the invalid service multicast set, removing the second target multicast VLAN from the candidate multicast set, and adding the second target multicast VLAN to the current multicast set; and receiving, after replacing the first user VLAN in the first multicast request with the second target multicast VLAN tag, the multicast traffic sent by the multicast router through the second target multicast VLAN, and forwarding the multicast traffic to the first user.

4. The multicast method according to claim 3, wherein the monitoring multicast traffic corresponding to the first multicast channel address comprises:

when forwarding the multicast request to the multicast router, starting a traffic monitoring timer to periodically monitor the multicast traffic corresponding to the first multicast channel address.

5. The multicast method according to claim 3, wherein the performing the HASH operation by using the multicast channel-addresses and the candidate multicast set as the inputs to obtain the second target multicast VLAN comprises:

determining whether the candidate multicast set is null;

when the candidate multicast set is not null, performing the HASH operation directly by using the first multicast channel address and the candidate multicast set as the inputs to obtain the second target multicast VLAN; and when the candidate multicast set is null, re-initializing the current multicast set and the invalid service multicast set to be null and the candidate multicast set to comprise the multiple multicast VLANs, and then starting a delay timer; when the delay timer expires, performing the HASH operation by using the first multicast channel address and the candidate multicast set as the inputs to obtain the second target multicast VLAN.

6. The multicast method according to claim 3, wherein the re-forwarding the first multicast request to the multicast router after replacing the first user VLAN tag in the multicast request with the second target multicast VLAN tag, comprises:

forwarding the first multicast request, in which the first user VLAN tag is replaced with the second target multicast VLAN tag, to the multicast router; and the receiving multicast traffic sent by the multicast router through the second target multicast VLAN, and forwarding the multicast traffic to the first user comprises:

when receiving the multicast traffic sent by the multicast router through the first target multicast VLAN, forwarding the multicast traffic to the first user after replacing the first target multicast VLAN tag in the multicast traffic with the first user VLAN tag; removing the first target multicast VLAN from the invalid service multicast set, and adding the first target multicast VLAN to the current multicast set; removing the second target multicast VLAN from the current multicast set, and adding the second target multicast VLAN to the candidate multicast set to receive the multicast traffic according to the first target multicast VLAN; and when failing to receive the multicast traffic sent by the multicast router through the first target multicast VLAN, forwarding the multicast traffic to the first user after replacing the second target multicast VLAN tag in the multicast traffic with the first user VLAN tag, so as to receive the multicast traffic according to the second target multicast VLAN.

7. A switch, comprising:

a computing hardware; and a non-transitory computer-readable storage medium including computer-executable instructions executed by the computing hardware to perform on the switch, when directly connected to a first user and a second user, the method comprising:

receiving a first multicast request from the first user, wherein the first multicast request comprises a first multicast channel address and a first user virtual local area network (VLAN) tag;

selecting, in response to receiving the first multicast request from the first user, a first target multicast VLAN from pre-configured multiple multicast VLANs, the selecting including:

establishing: a current multicast set, an invalid service multicast set, and a candidate multicast set for the first multicast channel;

initializing: the current multicast set to be null, the invalid service multicast set to be null, and the candidate multicast set to comprise multiple multicast VLANs;

performing a HASH operation, using the first multicast channel address and the candidate multicast set as inputs, to obtain the first target multicast VLAN from the candidate multicast set; and removing the first target multicast VLAN from the candidate multicast set, and adding the first target multicast VLAN to the current multicast set;

forwarding, after the selecting, the first multicast request to a multicast router through target multicast VLAN after replacing the first user VLAN tag in the first multicast request with a first target multicast VLAN tag;

receiving, after the selecting, a second multicast request from the second user, wherein the second multicast request comprises the first multicast channel address and a second user VLAN tag;

receiving multicast traffic sent by the multicast router through the first target multicast VLAN, and forwarding, in response to the receiving multicast traffic, the multicast traffic to:

the first user by replacing the first target multicast VLAN tag in the multicast traffic with the first user VLAN tag, and the second user by replacing the first target multicast VLAN tag in the multicast traffic with the second user VLAN tag, thereby ensuring only one copy of the multicast traffic, forwarded by the switch to the directly connected first user and second user, is transmitted in a path from the multicast router to the switch.

8. The switch according to claim 7, further comprising computer-executable instructions for:

before receiving the first multicast request from the first user, pre-configuring the multiple multicast VLANs, and configure a different physical multicast path for each of the multicast VLANs.

9. The switch according to claim 7, further comprising computer-executable instructions for:

monitoring the multicast traffic corresponding to the first multicast channel address after forwarding the first multicast request to the multicast router after replacing the first user VLAN tag in the first multicast request with the first target multicast VLAN tag;

when the multicast traffic is abnormal, performing the HASH operation by using the multicast channel address and the candidate multicast set as the inputs to obtain a second target multicast VLAN;

replacing the first user VLAN tag in the first multicast request with the second target multicast VLAN tag, and thereafter performing the further steps of:

re-forwarding the first multicast request to the multicast router;

removing the first target multicast VLAN from the current multicast set, adding the first target multicast VLAN to the invalid service multicast set;

removing the second target multicast VLAN from the candidate multicast set, and adding the second target multicast VLAN to the current multicast set; and receiving, after replacing the first user VLAN in the first multicast request with the second target multicast VLAN tag, the multicast traffic sent by the multicast router through the second target multicast VLAN, and forward the multicast traffic to the first user.

10. The switch according to claim 9, wherein the monitoring multicast traffic corresponding to the first multicast channel address comprises:

when forwarding the first multicast request to the multicast router, start a traffic monitoring timer to periodically monitor the multicast traffic corresponding to the first multicast channel address.

11. The switch according to claim 9, wherein the performing the HASH operation by using the multicast channel address and the candidate multicast set as the inputs to obtain the second target multicast VLAN comprises:

a determining whether the candidate multicast set is null;

when the candidate multicast set is not null, performing the HASH operation directly by using the first multicast channel address and the candidate multicast set as the inputs to obtain the second target multicast VLAN; and when the candidate multicast set is null, re-initializing the current multicast set and the invalid service multicast set to be null and the candidate multicast set to comprise the multiple multicast VLANs when the candidate multicast set is null, and then start a delay timer; when the delay timer expires, perform the HASH operation by using the first multicast channel address and the candidate multicast set as the inputs to obtain the second target multicast VLAN.

12. The switch according to claim 9, wherein the re-forwarding the first multicast request to the multicast router after replacing the first user VLAN tag in the multicast request with the second target multicast VLAN tag, comprises forwarding the first multicast request, in which the first user VLAN tag is replaced with the second target multicast VLAN tag, to the multicast router; and wherein the receiving multicast traffic sent by the multicast router through the first target multicast VLAN, and forwarding the multicast traffic to the first user comprises receiving the multicast traffic sent by the multicast router through the first target multicast VLAN, forwarding the multicast traffic to the first user after replacing the first target multicast VLAN tag in the multicast traffic with the first user VLAN tag; removing the first target multicast VLAN from the invalid service multicast set, and adding the first target multicast VLAN to the current multicast set; removing the second target multicast VLAN from the current multicast set, and adding the second target multicast VLAN to the candidate multicast set to receive the multicast traffic according to the first target multicast VLAN.

\* \* \* \* \*

UNITED STATES PATENT AND TRADEMARK OFFICE
CERTIFICATE OF CORRECTION

PATENT NO. : 9,215,078 B2  
APPLICATION NO. : 14/025491  
DATED : December 15, 2015  
INVENTOR(S) : Ding et al.

Page 1 of 1

It is certified that error appears in the above-identified patent and that said Letters Patent is hereby corrected as shown below:

IN THE CLAIMS

Column 17, line 61, "addresses" should read -- address --.

Column 19, line 2, "through target" should read -- through the first target --.

Signed and Sealed this
Fifth Day of April, 2016

Michelle K. Lee
*Director of the United States Patent and Trademark Office*